United States Patent
Culp et al.

(10) Patent No.: US 8,141,027 B2
(45) Date of Patent: Mar. 20, 2012

(54) AUTOMATED SENSITIVITY DEFINITION AND CALIBRATION FOR DESIGN FOR MANUFACTURING TOOLS

(75) Inventors: James A. Culp, Hopewell Junction, NY (US); Jason D. Hibbeler, Essex Junction, VT (US); Lars W. Liebmann, Hopewell Junction, NY (US); Tina Wagner, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 12/652,409

(22) Filed: Jan. 5, 2010

(65) Prior Publication Data
US 2011/0166686 A1 Jul. 7, 2011

(51) Int. Cl.
*G06F 17/50* (2006.01)
(52) U.S. Cl. .......... 716/136; 716/106; 716/111
(58) Field of Classification Search .......... 716/106, 716/111, 136
See application file for complete search history.

(56) References Cited

U.S. PATENT DOCUMENTS

| | | | |
|---|---|---|---|
| 7,120,895 B2 | 10/2006 | Ye et al. | |
| 7,712,056 B2 * | 5/2010 | White et al. | 716/136 |
| 2007/0157139 A1 | 7/2007 | White et al. | |
| 2007/0264731 A1 | 11/2007 | Jeng | |
| 2008/0295046 A1 | 11/2008 | Su et al. | |
| 2009/0031271 A1 | 1/2009 | White et al. | |
| 2009/0210183 A1 | 8/2009 | Rajski et al. | |

* cited by examiner

*Primary Examiner* — Sun Lin
(74) *Attorney, Agent, or Firm* — Cantor Colburn LLP; Daniel Schnurmann

(57) ABSTRACT

A method of automatic calibration of a design for manufacturing (DfM) simulation tool includes providing, as a first input, one or more defined rules for each of one or more semiconductor device levels to be simulated by the tool, and providing, as a second input, a plurality of defined feature size threshold ranges and increments for use in histogram generation of a number of failures with respect to a reference circuit; providing, as a third input, the reference circuit; executing the defined rules for the semiconductor device levels to be simulated, and outputting a fail count for the reference circuit at each defined threshold value, thereby generating histogram data of fail count versus threshold for the reference circuit; and providing, as a fourth input, a defined fail count metric, thereby calibrating the DfM tool for use with respect to a target circuit.

17 Claims, 4 Drawing Sheets

AUTOMATED SENSITIVITY DEFINITION AND CALIBRATION FOR DESIGN FOR MANUFACTURING TOOLS

BACKGROUND

The present invention relates generally to integrated circuit device design techniques and, more particularly, to implementing automated sensitivity definition and calibration for design for manufacturing (DfM) tools.

In designing an integrated circuit (IC) device, engineers or designers typically rely on computer design tools to help create an IC schematic or design, which can include a multitude of individual devices, such as transistors, coupled together to perform a certain function. To actually fabricate the IC device in or on a semiconductor substrate, the IC device schematic must be translated into a physical representation or layout, which itself can then be transferred onto a semiconductor substrate. Computer aided design (CAD) tools can be used to assist layout designers with translating the discrete circuit elements into shapes, which will embody the devices themselves in the completed IC device. These shapes make up the individual components of the circuit, such as gate electrodes, diffusion regions, metal interconnects and the like.

The software programs employed by the CAD systems to produce layout representations are typically structured to function under a set of predetermined design rules in order to produce a functional circuit. Often, the design rules are determined by certain processing and design limitations based both on the patternability of layout designs, and other processing constraints (such as etch rates and selectivities). For example, design rules may define the space tolerance between devices or interconnect lines. Once the layout of the circuit has been created, the next step in manufacturing the IC device is to transfer the layout onto a semiconductor substrate. Optical lithography or photolithography is a well-known process for transferring geometric shapes onto the surface on a semiconductor wafer. The photolithography process generally begins with the formation of a photoresist layer on the top surface of a semiconductor substrate or wafer. A reticle or mask having fully light non-transmissive opaque regions (which are often formed of chrome) and fully light transmissive clear regions (which are often formed of quartz) is then positioned over the photoresist coated wafer.

The mask is placed between a radiation or light source, which can produce light of a pre-selected wavelength (e.g., ultraviolet light) and geometry, and an optical lens system, which may form part of a stepper apparatus. When the light from the light source is directed onto the mask, the light is focused to generate a reduced mask image on the wafer, typically using the optical lens system, which may contain one or several lenses, filters, and/or mirrors. This light passes through the clear regions of the mask to expose the underlying photoresist layer, and is blocked by the opaque regions of the mask, leaving that underlying portion of the photoresist layer unexposed. The exposed photoresist layer is then developed, typically through chemical removal of the exposed or unexposed regions of the photoresist layer. The end result is a semiconductor wafer coated with a photoresist layer exhibiting a desired pattern, which defines the geometries, features, lines and shapes of that layer. This pattern can then be used for etching underlying regions of the wafer.

As indicated above, technology must provide ground rules to designers on order to ensure that designs passing the defined ground rules are in fact manufacturable. Current ground rule development includes simulations and hardware measurements on limited topologies, dominantly one-dimensional (e.g., typically varying one parameter) to determine allowed edge relations, in conjunction with optical proximity correction (OPC) techniques. However, as the size of design features continues to scale below the wavelength of the patterning light source (a situation that is becoming progressively worse), more of the layout needs to be examined to determine whether the design is manufacturable. Two dimensional, context based effects are increasingly limiting the lithographic capability and process window.

SUMMARY

A method of automatic calibration of a computer executable design for manufacturing (DfM) simulation tool used in semiconductor manufacturing includes providing, as a first input to the DfM simulation tool, one or more defined rules for each of one or more semiconductor device levels to be simulated by the DfM simulation tool, and providing, as a second input to the DfM simulation tool, a plurality of defined feature size threshold ranges and increments for use in histogram generation of a number of failures across the ranges and increments, with respect to a reference circuit design; providing, as a third input to the DfM simulation tool, the reference circuit design, which comprises a circuit design previously determined to be manufacturable; executing, with the DfM simulation tool, each of the one or more defined rules for each of the one or more semiconductor device levels to be simulated, and outputting a fail count for the reference circuit design at each defined threshold value, thereby generating histogram data of fail count versus threshold for the reference circuit design; and providing, as a fourth input to the DfM simulation tool, a defined fail count metric, thereby calibrating the DfM tool for use with respect to a target circuit design.

In another embodiment, a method of automatic calibration of a computer executable design for manufacturing (DfM) simulation tool used in semiconductor manufacturing, the method including providing, as a first input to the DfM simulation tool, one or more defined rules for each of one or more semiconductor device levels to be simulated by the DfM simulation tool, and providing, as a second input to the DfM simulation tool, a plurality of defined feature size threshold ranges and increments for use in histogram generation of a number of failures across the ranges and increments, with respect to a reference circuit design; providing, as a third input to the DfM simulation tool, the reference circuit design, which comprises a circuit design previously determined to be manufacturable; executing, with the DfM simulation tool, each of the one or more defined rules for each of the one or more semiconductor device levels to be simulated, and outputting a fail count for the reference circuit design at each defined threshold value, thereby generating histogram data of fail count versus threshold for the reference circuit design; executing, with the DfM simulation tool, each of the one or more defined rules for each of the one or more semiconductor device levels to be simulated, and outputting a fail count for a target circuit design at each defined threshold value, thereby generating histogram data of fail count versus threshold for the target circuit design; and providing, as a fourth input to the DfM simulation tool, a defined threshold for a quality metric, thereby calibrating the DfM tool for use with respect to the target circuit design.

In still another embodiment, a method of performing integrated circuit analysis with a computer executable design for manufacturing (DfM) simulation tool used in semiconductor manufacturing, the method including initiating a calibration sequence for the DfM simulation tool, the calibration sequence including providing, as a first input to the DfM simulation tool, one or more defined rules for each of one or more semiconductor device levels to be simulated by the DfM simulation tool, and receiving, as input to the DfM simulation tool, a plurality of defined feature size threshold ranges and increments for use in histogram generation of a number of failures across the ranges and increments, with respect to a reference circuit design; providing, as a second input to the DfM simulation tool, the reference circuit design, which comprises a circuit design previously determined to be manufacturable; executing, with the DfM simulation tool, each of the one or more defined rules for each of the one or more semiconductor device levels to be simulated, and outputting a fail count for the reference circuit design at each defined threshold value, thereby generating histogram data of fail count versus threshold for the reference circuit design; and providing, as a third input to the DfM simulation tool, a defined fail count metric, thereby calibrating the DfM tool for use with respect to a target circuit design; executing, with the DfM simulation tool, each of the one or more defined rules for each of the one or more semiconductor device levels to be simulated, and outputting a fail count for the target circuit design at each defined threshold value, thereby generating histogram data of fail count versus threshold for the target circuit design; and comparing the number of fail counts for individual threshold values across the defined threshold ranges of the target circuit design with those of the reference circuit design, so as to identify any process limitations in the target circuit design.

BRIEF DESCRIPTION OF THE SEVERAL VIEWS OF THE DRAWINGS

Referring to the exemplary drawings wherein like elements are numbered alike in the several Figures.

DETAILED DESCRIPTION

Figure 1:
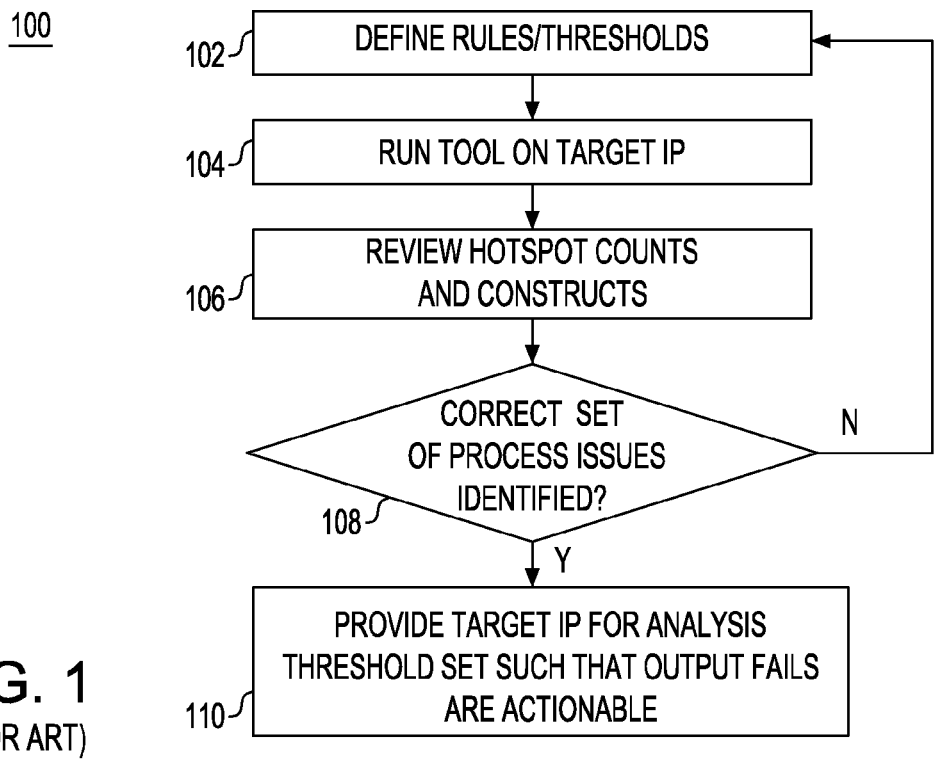
FIG. 1 is a flow diagram illustrating a simulation tool configuration practice.

Design for Manufacturability (DFM) simulation tools (e.g., lithography contour simulation/hot spot detection, critical area analysis, CMP thickness simulation/hot spot detection) can be set up to identify constructs that are not necessarily process limiting nor require designer action for layout/ yield optimization for a given technology and design. Presently, simulation tool configuration is based on engineering judgment and essentially consists of defining rules and assigning thresholds appropriate to the particular simulation. Such an exemplary process flow 100 is illustrated in FIG. 1.

For example, for a lithography simulation that is intended to identify so called "hot spots," rules and thresholds would be specified (FIG. 1, block 102) for short and opens for different layers: PC (gate layer), RX (active area), CA (contact between active area and the first metal layer M1), Mx, etc. The failing constructs (i.e., hot spots) that are identified after running the simulation on the target circuit design (IP) (block 104) are highly dependent on the rules and thresholds defined during the simulation tool set up (block 102). Again, using the example of lithography simulation/hot spot detection, the simulation tool functions by assessing contours relative to rules and thresholds for fails that are coded into the tool. If the rules/thresholds are defined without calibration to the technology and layout style/specifics, the results may be unusable for appropriate learning, application, and/or correction.

The current solution is to do deep engineering work to review specific failing structures (block 106) and make an engineering judgment as to whether these particular constructs pose real process concerns (decision block 108). If the simulation rules/thresholds are inappropriate to detect real process sensitivities that need to be addressed, then new rules/ thresholds are tried and resultant fails are again reviewed (i.e., return to block 102). The process is repeated until such time as appropriate rules/thresholds are finally defined that identify legitimate, actionable process concerns (block 110).

Accordingly, disclosed herein is a method to calibrate these types of simulation tools based on technology ground rules, layout style and specific layouts. Calibration of the tools based on the technology and designs that are being assessed will produce tool signals that are relevant to the layout being assessed. With present embodiments, the tool setup is automated such that the output of the tool will be appropriate for technology/manufacturability/yield learning and/or design optimization. Once calibrated, the threshold(s) in the model simulation will be set such that an appropriate number of errors are flagged for design optimization, which errors are relevant to the particular product. Automated tool calibration relative to actual process limiting structures and/or target error levels is superior to iterative calibration processes based on engineering judgments by (for example) being able to incorporate and/or consider many more actual constructs than a manual engineering review of specific fails.

More specifically, the disclosed embodiments herein describe an automatic method to calibrate DfM simulation tools based on technology ground rules, layout style and specific layouts. The particular implementation thereof will depend on the details of specific simulation tool structure and set up. As one non-limiting example, for a lithography simulation tool, technology IP and layout specifics for actual proven designs can be used to calibrate the tool. Approximate calibration may be set up with technology elements (e.g., ground rule/yield macros and SRAM bit cells), and the calibration can be automatically refined for each layout to which the simulation is applied. The calibration is used to set the appropriate sensitivity of the rules and thresholds to determine true process window limitations in the layout. The features identified as hot spots/fails after calibration could then either be fed back to the technology team for further process improvement, added inspections, etc. or to the design team for layout optimization for yield benefit.

Figure 2:
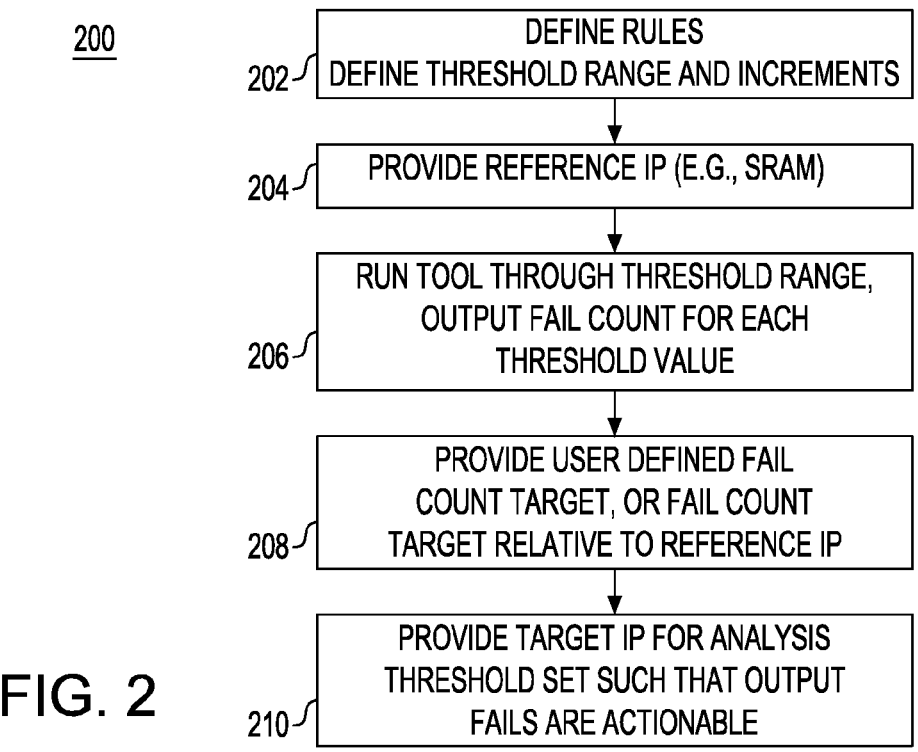
FIG. 2 is a flow diagram illustrating an exemplary method of automatic calibration for a design for manufacturing simulation tool, in accordance with an embodiment of the invention.

In an exemplary embodiment, the automatic feature of the calibration may be implemented in the simulation tool as a set up step, which includes the generation of one or more histograms of fail types and severities relative to a reference design. The simulation tool thresholds would then be set relative to the number of fails compared to the reference design. This ensures that fails are true process concerns relative to the overall design, and the fails that are identified require review/action. FIG. 2 is a flow diagram illustrating an exemplary method 200 of automatic calibration for a design for manufacturing simulation tool, in accordance with an embodiment of the invention. In actuality, the process flow would be implemented for each semiconductor device level to be simulated (e.g., PC, RX, CA, M1. etc.) and for each rule that is defined for each level. However, for ease of description, the flow diagram 200 of the exemplary embodiment is described in the context of a device single level and a single rule.

As shown in block 202, the relevant rules for each level to be simulated (e.g. PC, RX, CA, M1, etc.) are defined. Further, for each level and each rule, the feature size threshold range and increments (values) to run for histogram generation are also defined as inputs to the simulation tool. Then, as shown in block 204, the simulation tool is provided with reference IP (e.g., SRAM macro, technology ground rule macros, etc.). Again, the reference IP represents actual proven designs to which simulated fails in the target IP can be compared.

Proceeding to block 206, the simulation tool is run for given level/rule iteratively through each of the threshold values across the range defined above for the reference IP. The fail count at each threshold value is output, and may be used to generate a histogram of fail counts versus threshold for the proven reference IP. Once the reference histogram data is determined, a user defined fail count target (or a user defined fail count relative to the reference IP) is established, as shown in block 208. The user defined fail count may be. For example, the fail count target may be independent of the reference IP data, or it may be some function with respect to the reference IP data (e.g., 90% of the threshold value at which reference IP yields a selected number of fails). Regardless of how the fail count target is established, the simulation tool is then ready to run on the target IP for analysis without any engineering judgment or specific analysis of fail constructs. As reflected in block 210, any determined output fails/hot spots thus represent real manufacturing process limitations or designer actionable fails, thereby eliminating the need for the type of trial and error process associated with the practice of FIG. 1.

The calibration method described above thus allows for a DFM simulation tool to be automatically calibrated to a meaningful, actionable set of thresholds and fail criteria. One benefit of using reference IP to avoid the detailed engineering work to provide a calibrated simulation tool is that it enables individuals outside of electronic design automation (EDA)/technology development to take advantage of these simulation tools to identify layout constructs that need action (e.g., process improvement, additional inspections, design modification). In addition, design quality can also be assessed relative to the reference IP as well. For instance, it is possible that there will be layouts for which the transition from a robust process regime to a process window limited regime is very abrupt. Such a scenario may be illustrated by reference to the exemplary histograms shown in FIGS. 3(a) and 3(b).

Figure 3A:
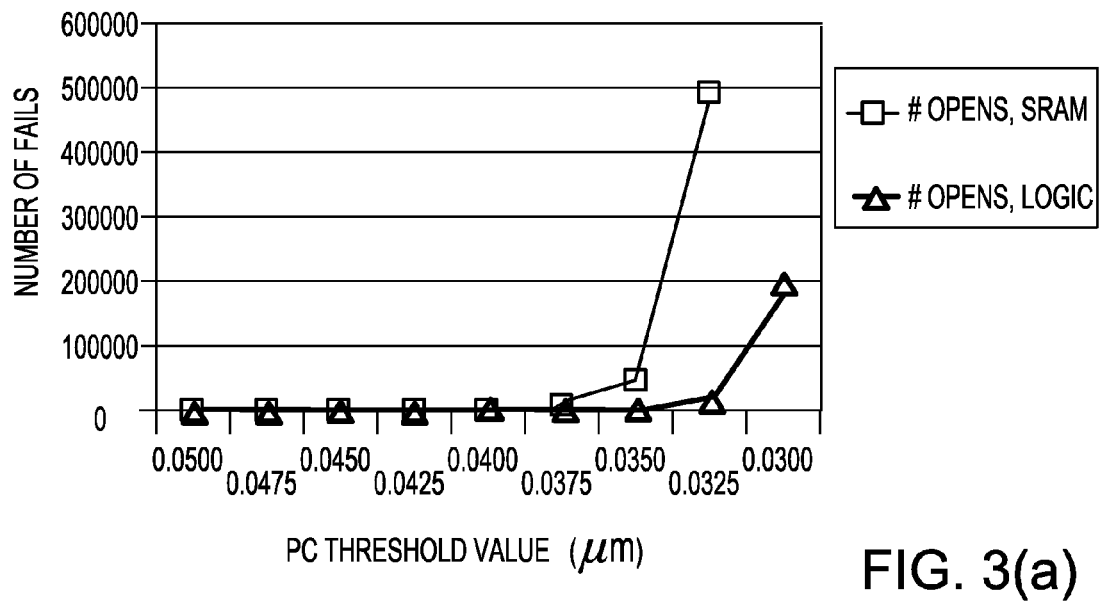
FIGS. 3(a) and 3(b) are exemplary histograms that may be generated using the method illustrated in FIG. 2.

More specifically, FIG. 3(a) is a first histogram that compares the number of fails (opens) in the PC level as a function of line width, for both the reference IP (SRAM) and the target IP (logic circuitry). As can be seen, the number of SRAM fails (reference IP) begins to increase dramatically as the PC threshold value decreases below about 35 nanometers. On the other hand, the number of logic fails (target IP) does not begin to increase dramatically until the PC threshold value decreases below about 32.5 nanometers. In other words, the threshold value for significant logic fails of the target IP is a smaller value than for the reference IP SRAM array. In this instance then, the process window and product yield (for this rule and this level) would be limited only by the proven design SRAM, and therefore no fails should be identified in the logic. That is, Histogram #1 reflects SRAM dominant fails.

Figure 3B:
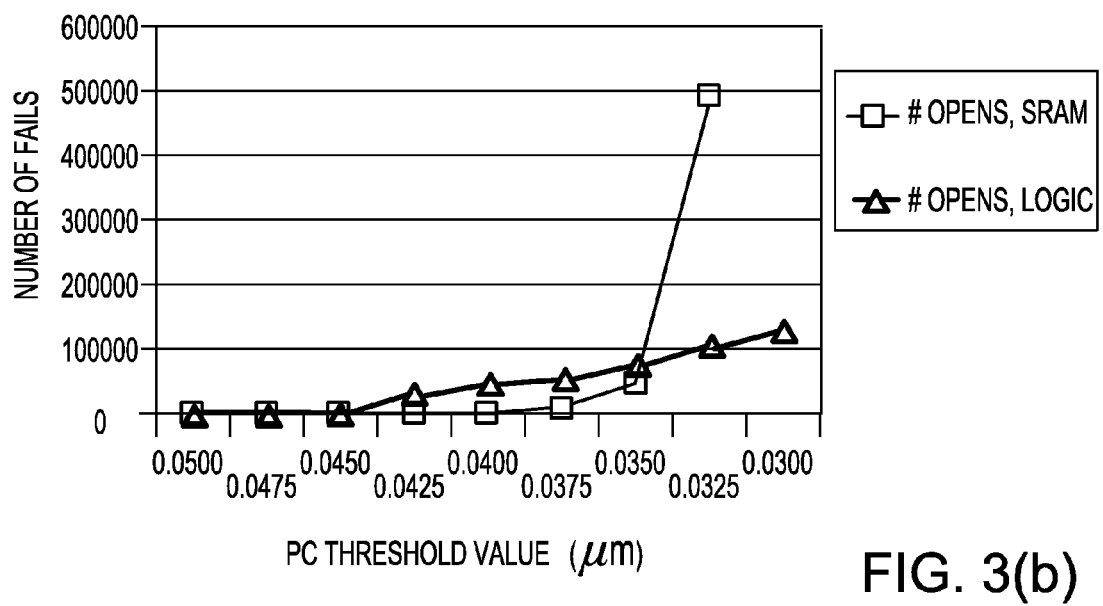

In contrast, FIG. 3(b) is a second histogram that compares the number of fails (opens) in the PC level as a function of line width, for both the reference IP (SRAM) and the target IP (logic circuitry). Here, it will be seen that while the number of SRAM fails again begins to increase dramatically as the PC threshold value decreases below about 35 nanometers, the number of logic fails begins to demonstrably increase as the PC threshold falls below about 42.5 nanometers (although not dramatically so). In this scenario, Histogram #2 reflects logic dominant fails, representing layout areas where the logic region of the layout can be optimized and would result in improved product yield.

Figure 4:
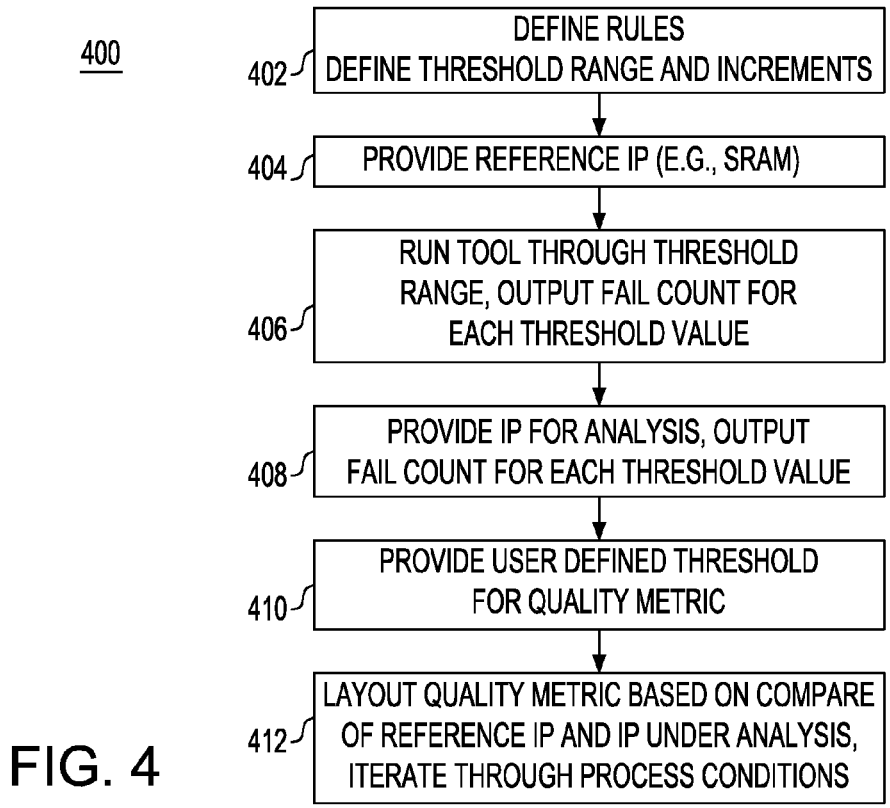
FIG. 4 is a flow diagram for implementing automated sensitivity definition and calibration for DfM tools at different process conditions, in accordance with a further embodiment of the invention.

An alternative use of this calibration method may be to define a layout quality metric. This could be done relative to reference IP (as illustrated in the histograms of FIGS. 3(a) and 3(b)) or to a process window parameter, for example. In this regard, FIG. 4 is a flow diagram 400 for implementing automated sensitivity definition and calibration for DfM tools at different process conditions, in accordance with a further embodiment of the invention. Similar to the first embodiment, the calibration set up is done for each level to be simulated (e.g., PC, RX, CA, M1, etc.) and for each rule that is defined for each level. Again, the present description, for purposes of simplicity, illustrates one level and one rule.

The first three operations of FIG. 4 are similar to those shown in FIG. 2. That is, in block 402, the relevant rules for each level to be simulated (e.g. PC, RX, CA, M1, etc.) are defined. Further, for each level and each rule, the threshold range and increments to run for histogram generation are also defined as inputs to the simulation tool. Then, as shown in block 404, the simulation tool is provided with reference IP (e.g., SRAM macro, technology ground rule macros, etc.). Again, the reference IP represents actual proven designs to which simulated fails in the target IP can be compared.

Proceeding to block 406, the simulation tool is run for given level/rule iteratively through each of the threshold values across the range defined above for the reference IP. The fail count at each threshold value is output, and may be used to generate a histogram of fail counts versus threshold for the proven reference IP. Then, as shown in block 408, the simulation tool is run on the target IP for given level/rule iteratively through each threshold value across the range defined above. At each threshold value, the fail count for the target IP is output, and a histogram of fail count versus threshold for target IP generated. Then, in block 410, user defined thresholds are provided for quality metrics. This enables a determination of layout quality metrics based on a comparison of the reference and target IP, as shown in block 412. The simulations are iterated through process conditions of interest, wherein a layout metric is calculated, for example, as the difference between the number of fails at a given threshold for a second process condition and a first process condition, divided by the number fails at the threshold for the reference IP.

Figure 5:
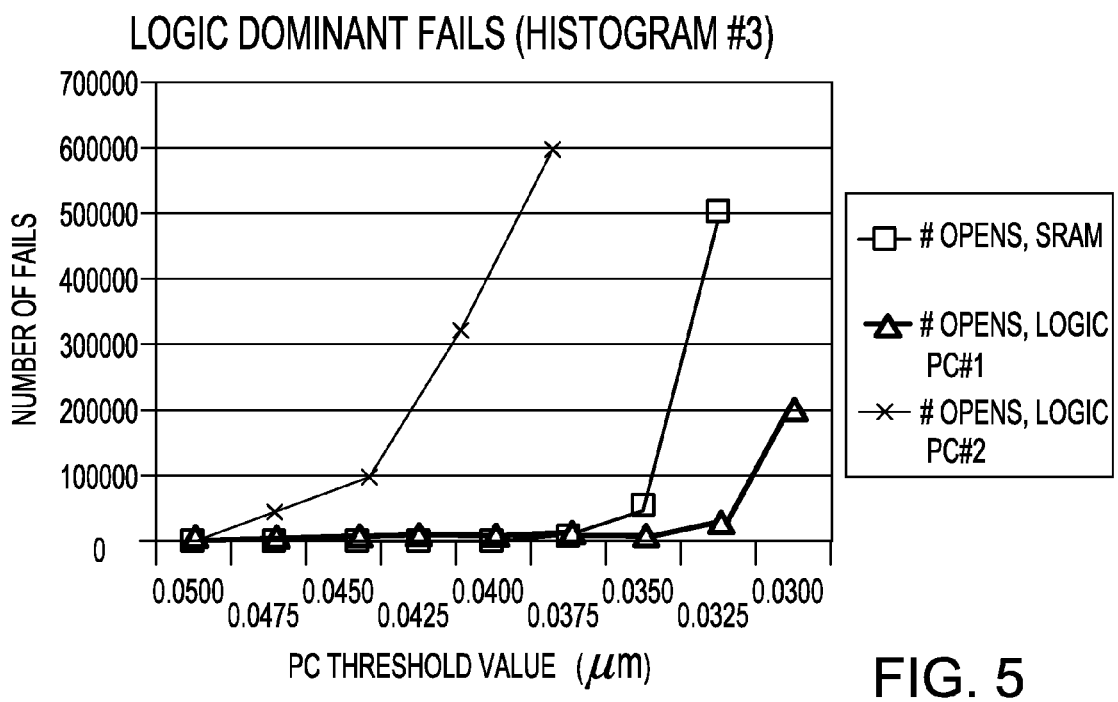
FIG. 5 is an exemplary histogram that may be generated using the method illustrated in FIG. 4.

By way of further illustration, FIG. 5 is a third histogram that compares the number of fails (opens) in the PC level as a function of line width, for the reference IP (SRAM) and the target IP (logic circuitry), at first and second processing conditions for the target IP. Here, the transition from a robust process (PC#1) to one with a large number of hot spots/fails (PC#2) as shown in Histogram #3 can be used to generate layout quality metric as summarized in the flow diagram above. As will thus be appreciated, the present invention embodiments represent a significant enhancement in DfM simulation tool capability that will enable use of these tools both by the technology community for process robustness learning and the design community for layout optimization.

Figure 6:
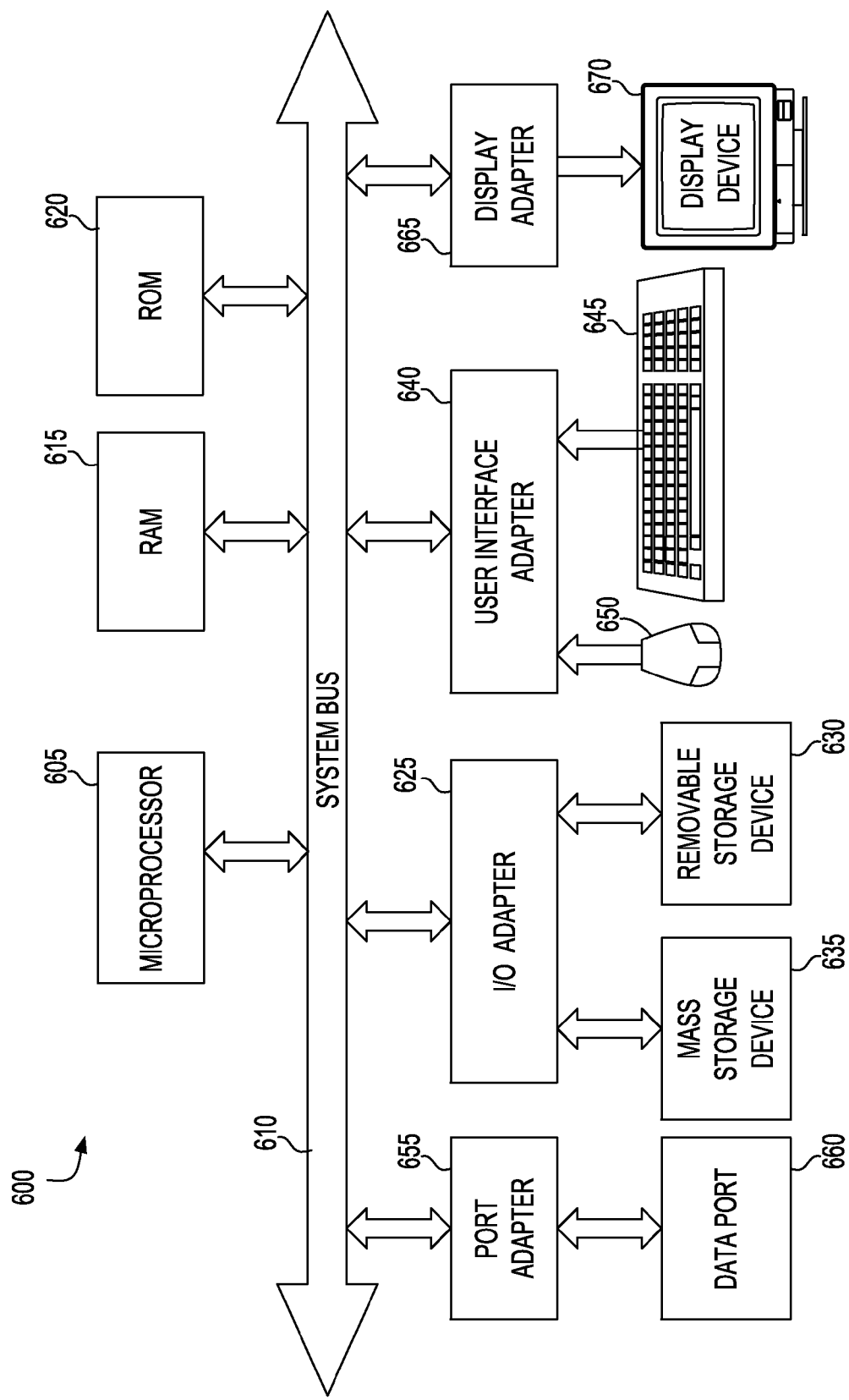
FIG. 6 is a schematic block diagram of a general-purpose computing system suitable for practicing embodiments of the present invention.

Generally, the method embodiments for implementing automated sensitivity definition and calibration for design for manufacturing (DfM) tools may be practiced with a general-purpose computer and the method may be coded as a set of instructions on removable or hard media for use by the general-purpose computer. FIG. 6 is a schematic block diagram of a general-purpose computing system suitable for practicing embodiments of the present invention. In FIG. 6, computing system 600 has at least one microprocessor or central processing unit (CPU) 605. CPU 605 is interconnected via a system bus 610 to a random access memory (RAM) 615, a read-only memory (ROM) 620, an input/output (I/O) adapter 625 for a connecting a removable data and/or program storage device 630 and a mass data and/or program storage device 635, a user interface adapter 640 for connecting a keyboard 645 and a mouse 650, a port adapter 655 for connecting a data port 660 and a display adapter 665 for connecting a display device 670.

ROM 620 contains the basic operating system for computing system 600. The operating system may alternatively reside in RAM 615 or elsewhere as is known in the art. Examples of removable data and/or program storage device 630 include magnetic media such as floppy drives and tape drives and optical media such as CD ROM drives. Examples of mass data and/or program storage device 635 include hard disk drives and non-volatile memory such as flash memory. In addition to keyboard 645 and mouse 650, other user input devices such as trackballs, writing tablets, pressure pads, microphones, light pens and position-sensing screen displays may be connected to user interface 640. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 630, fed through data port 660 or typed in using keyboard 645.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 1, 2 and 5.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of automatic calibration of a computer executable design for manufacturing (DfM) simulation tool used in semiconductor manufacturing, the method comprising:
   providing, as a first input to the DfM simulation tool, one or more defined rules for each of one or more semiconductor device levels to be simulated by the DfM simulation tool, and providing, as a second input to the DfM simulation tool, a plurality of defined feature size threshold ranges and increments for use in histogram generation of a number of failures across the ranges and increments, with respect to a reference circuit design;
   providing, as a third input to the DfM simulation tool, the reference circuit design, which comprises a circuit design previously determined to be manufacturable;
   executing, with the DfM simulation tool, each of the one or more defined rules for each of the one or more semiconductor device levels to be simulated, and outputting a fail count for the reference circuit design at each defined threshold value, thereby generating histogram data of fail count versus threshold for the reference circuit design; and
   providing, as a fourth input to the DfM simulation tool, a defined fail count metric, thereby calibrating the DfM tool for use with respect to a target circuit design.

2. The method of claim 1, wherein the one or more semiconductor device levels to be simulated comprise one or more of: PC (gate layer), RX (active area), CA (contact between active area and a first metal layer M1), and metal levels (Mx).

3. The method of claim 1, wherein the reference circuit design comprises an SRAM cell.

4. The method of claim 1, wherein the reference circuit design comprises one or more ground rule macros.

5. The method of claim 1, wherein the defined fail count metric comprises one of: a defined fail count target and a fail count target relative to the reference circuit design.

6. A method of automatic calibration of a computer executable design for manufacturing (DfM) simulation tool used in semiconductor manufacturing, the method comprising:
   providing, as a first input to the DfM simulation tool, one or more defined rules for each of one or more semiconductor device levels to be simulated by the DfM simulation tool, and providing, as a second input to the DfM simulation tool, a plurality of defined feature size threshold ranges and increments for use in histogram generation of a number of failures across the ranges and increments, with respect to a reference circuit design;
   providing, as a third input to the DfM simulation tool, the reference circuit design, which comprises a circuit design previously determined to be manufacturable;
   executing, with the DfM simulation tool, each of the one or more defined rules for each of the one or more semiconductor device levels to be simulated, and outputting a fail count for the reference circuit design at each defined threshold value, thereby generating histogram data of fail count versus threshold for the reference circuit design;

executing, with the DfM simulation tool, each of the one or more defined rules for each of the one or more semiconductor device levels to be simulated, and outputting a fail count for a target circuit design at each defined threshold value, thereby generating histogram data of fail count versus threshold for the target circuit design; and providing, as a fourth input to the DfM simulation tool, a defined threshold for a quality metric, thereby calibrating the DfM tool for use with respect to the target circuit design.

7. The method of claim 6, wherein the one or more semiconductor device levels to be simulated comprise one or more of: PC (gate layer), RX (active area), CA (contact between active area and a first metal layer M1), and metal levels (Mx).

8. The method of claim 6, wherein the reference circuit design comprises an SRAM cell.

9. The method of claim 6, wherein the reference circuit design comprises one or more ground rule macros.

10. The method of claim 6, wherein the defined threshold for a quality metric comprises: a difference between a number of fails for first and second process conditions at a given threshold for the target circuit, the difference divided by a number of fails at the given threshold for the reference circuit.

11. A method of performing an integrated circuit analysis with a computer executable design for manufacturing (DfM) simulation tool used in semiconductor manufacturing, the method comprising:

initiating a calibration sequence for the DfM simulation tool, the calibration sequence comprising:

providing, as a first input to the DfM simulation tool, one or more defined rules for each of one or more semiconductor device levels to be simulated by the DfM simulation tool, and receiving, as input to the DfM simulation tool, a plurality of defined feature size threshold ranges and increments for use in histogram generation of a number of failures across the ranges and increments, with respect to a reference circuit design;

providing, as a second input to the DfM simulation tool, the reference circuit design, which comprises a circuit design previously determined to be manufacturable;

executing, with the DfM simulation tool, each of the one or more defined rules for each of the one or more semiconductor device levels to be simulated, and outputting a fail count for the reference circuit design at each defined threshold value, thereby generating histogram data of fail count versus threshold for the reference circuit design;

providing, as a third input to the DfM simulation tool, a defined fail count metric, thereby calibrating the DfM tool for use with respect to a target circuit design;

executing, with the DfM simulation tool, each of the one or more defined rules for each of the one or more semiconductor device levels to be simulated, and outputting a fail count for the target circuit design at each defined threshold value, thereby generating histogram data of fail count versus threshold for the target circuit design; and comparing a number of fail counts for individual threshold values across the defined threshold ranges of the target circuit design with those of the reference circuit design, so as to identify any process limitations in the target circuit design.

12. The method of claim 11, wherein a determination that a defined number of fail counts for the target circuit design occurs at a higher threshold value with respect to the reference circuit design is indicative of true process limitations in the target circuit design.

13. The method of claim 11, wherein a determination that a defined number of fail counts for the target circuit design occurs at a lower threshold value with respect to the target circuit design is indicative of an absence of process limitations in the target circuit design.

14. The method of claim 11, further comprising generating, for the reference circuit design, a histogram for the number of fail counts for individual threshold values across the defined threshold ranges.

15. The method of claim 14, further comprising generating, for the target circuit design, a histogram for the number of fail counts for individual threshold values across the defined threshold ranges.

16. The method of claim 11, further comprising iterating the executing of the plurality of defined threshold ranges on the target circuit design, for a plurality of processing conditions.

17. The method of claim 16, further comprising determining a layout quality metric for the target circuit design by comparing the number of fail counts for individual threshold values across the defined threshold ranges, for the plurality of processing conditions.

\* \* \* \* \*